Jan. 17, 1961

J. C. DUDDY 2,968,686

SEALED BATTERIES

Filed July 24, 1957

United States Patent Office 2,968,686
Patented Jan. 17, 1961

2,968,686
SEALED BATTERIES

Joseph C. Duddy, Trevost, Pa., assignor to The Electric Storage Battery Company, a corporation of New Jersey Filed July 24, 1957, Ser. No. 673,806

10 Claims. (Cl. 136—6)

This invention relates to rechargeable storage batteries and to methods of making them, more particularly to storage batteries of the alkaline type.

There have heretofore been many proposals of making sealed storage batteries of the alkaline type. One of the difficulties previously encountered in the hermetic sealing of the battery has been the undue rise of gas pressure, principally due to the spontaneous evolution of gases.

In accordance with the present invention, there has not only been realized a hermetically sealed rechargeable storage battery, but there has also been achieved unexpectedly high efficiencies in terms of the energy available on discharge relative to that introduced on charge of the battery.

In carrying out the invention in one form thereof, positive and negative electrodes selected from the group consisting of nickel, cadmium, iron, silver, zinc and copper are assembled in association with separator means disposed between each positive and negative electrode. The separator means is formed by at least two elements. One consists of a polyelectrolyte in continuous phase throughout a porous carrier, while the other and additional elements include a porous resiliently compressible material. Such an assembly is placed under compression, and while under compression is encapsulated in a polymerizable resin. Such resin is of the type which exhibits substantial shrinkage upon polymerization. Thus, the encapsulation of the assembly forms a container having an internal surface which presses against all external surfaces of the assembly to exclude all air from the assembly. The porous electrodes and the adjacent porous material are saturated with an alkaline electrolyte either before assembly or afterwards. Preferably, the electrodes as structurized, as by sintering. Formation of the electrodes preferably takes place after completion of the assembly. Batteries of the foregoing type provide the high efficiencies previously mentioned and which will later be set forth more in detail.

For additional objects and advantages of the invention and for a detailed description of the method of making storage batteries embodying the invention, reference is to be had to the accompanying drawings, in which.

Figure 1:
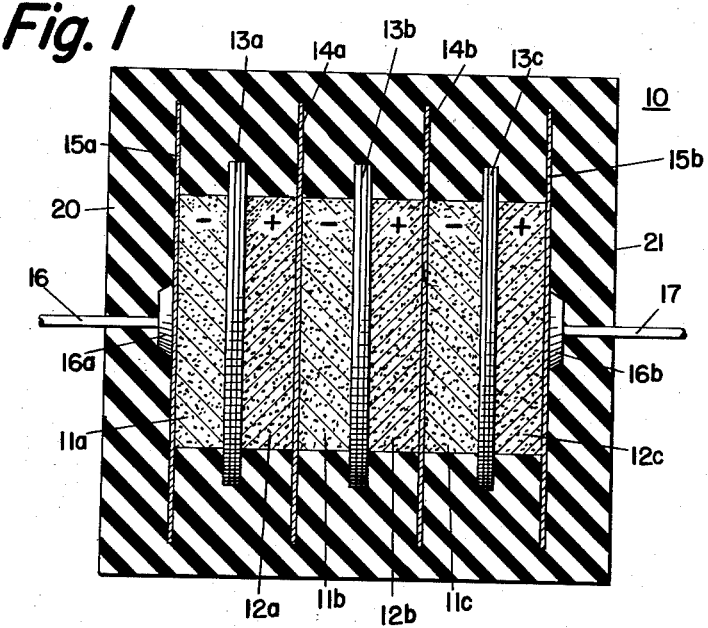
Fig. 1 is a cross-sectional view of a battery embodying the invention.

Referring now to Fig. 1, in a preferred form of the invention a storage battery 10, shown as of the pile-type, comprises a plurality of cells, each consisting of negative plates 11a, 11b and 11c and positive plates 12a, 12b and 12c. The electrodes or plates 11a and 12a are separated by an electrolyte-permeable separator means 13a which preferably extends outwardly from the entire periphery of the electrodes 11a and 12a. Separator means 13b and 13c are similarly provided for the cells 11b—12b and 11c—12c.

The adjacent cells have between them electrically conductive inter-cell connectors 14a and 14b, preferably extending outwardly from the entire periphery of the electrodes a greater distance than the separators. The connectors also form electrolyte barriers between cells. The respective ends of the assembly terminate at the electrically conductive plates 15a and 15b. Conductors 16 and 17 are preferably soldered or otherwise secured to the end plates 15a and 15b, though, as illustrated, conductive members 16a and 16b of relatively large area form abutment-type low-resistance electrical connections to the plates 15a and 15b.

The assembly thus far described, after being placed under axial compression, is encapsulated in a polymerizable resin which upon polymerization maintains or increases the compressive forces on the assembly. These forces are applied inwardly of the assembly from all directions. The end result is a storage battery which is hermetically sealed, in which there is an absence of air space, and in which the electrolyte is wholly contained within the porous material forming each cell of the battery.

As a result of the foregoing provisions, new and unexpected results, performance-wise, have been achieved. For example, with positive plates containing eleven grams of metallic silver powder, and with negative plates containing five and one-half grams of zinc oxide, and with the electrolyte consisting of a 31% aqueous solution of potassium hydroxide, there was obtained a discharge of 2.76 ampere hours with an input to the cell during charge of 2.88 ampere hours, a percentage return of better than 96.5%. The foregoing results were achieved on the first discharge of the cell following the first charging thereof. After the first discharge, the cell was again recharged with a total input of 2.66 ampere hours. Upon discharging the cell, there was achieved a total output of 2.66 ampere hours—a 100% return.

While the entire mechanism involved in the achievement of the above results is not entirely understood, it is believed that the following factors contribute to the exceptional reversibility and high efficiency of the battery.

Each negative electrode is structurized, as by sintering zinc oxide. They are made by placing a quantity of zinc oxide powder in a mold, for example, within a stainless steel ring. The powder is then pressed at a relatively low pressure, in the range of from 50 to 200 pounds per square inch. It is then removed from the mold or ring and is sintered for a time within the range of from 20 to 80 minutes at a temperature in the neighborhood of 750° C. For somewhat higher temperatures, the time will be selected from the lower part of the range. The fused or sintered wafers, with parallel faces, are then ready for assembly into the battery.

The positive electrodes are also structurized. They are made in the same manner as the negative electrodes, except that the starting material is powdered metallic silver. Preferably after the pressing of the silver powder, the resultant wafer is positioned on a disc of solid silver (which forms the electrically conductive electrolyte barrier), and the disc and wafer are then placed in the oven for sintering. After sintering, for example, for 30 minutes at 760° C. and immediately upon removal from the oven, the steel shaping ring is again placed around the wafer and pressure applied until the wafer-disc cools to room temperature. This maintains the adhesion of the solid disc to the porous wafer with the result that there is produced a low electrical resistance bond between the two and assures that the wafer and the disc have parallel surfaces. The foregoing procedure is used particularly for the positive end-electrode 12c and end disc 15b. For the positive plates 12a and 12b, the same procedure is followed, except that after cooling of each assembly, i.e., the assemblies 12a, 14a and 12b, 14b, a small quantity of mercury, as for example, about 0.05 gram, may be applied to the exposed face of the solid silver disc 14a, 14b and allowed to diffuse therein by heat treatment until amalgamation.

I have found it is important that both the negative and positive electrodes be structurized, by which term I mean that there is achieved an electrically connected matrix or relatively high particle cohesion and adequate to provide good handleability of the electrodes. Heretofore, it has been deemed necessary to provide a wrapping or other container for the zinc electrode because of the lack of structurization thereof. Sintering is the most convenient way of obtaining the desired structurization. The structurization, particularly of the zinc electrode, has been found to be important in preventing erosion due to solubility in the electrolyte of the zinc oxide.

Figure 2:
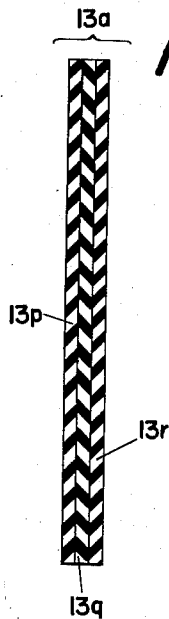
Fig. 2 is an enlarged sectional view of one of the separator means of Fig. 1.

The separator means 13a—13c, as shown in Fig. 2, are assemblies including at least two elements. One element 13q, Fig. 2, preferably comprises an ion exchange resin produced in situ within the pores of a carrier and in continuous phase throughout that carrier. More particularly, the porous carrier may be asbestos, polyethylene, polyvinyl chloride, or the copolymer of polyvinyl chloride, though I prefer to utilize polyethylene. The ion exchange resin is produced by impregnating the porous carrier with the monomeric ingredients necessary to form a cross-linked polymeric ion exchange resin. For example, there may be utilized:

| | Parts by weight |
|---|---|
| Methacrylic acid [1] | 100 |
| Divinyl benzene | 20 |
| Benzoyl peroxide | 4 |

[1] Including 0.1% hydro-quinone as polymerization inhibitor.

For further details as to how to produce the separator, reference is to be had to my copending application Serial No. 620,504, filed November 5, 1956, entitled "Battery Diaphragm." As explained in my said application, the homogeneity throughout the porous carrier of the ion exchange resin is of such degree that the resultant continuous phase thereof produces transparency of the element or diaphragm 13q.

On opposite sides of the separator or membrane 13q, which is effectively a continuous phase solid polyelectrolyte, there are disposed resiliently compressible, highly porous elements, 13p, 13r, preferably of microporous polyethylene. The microporous polyethylene is preferably made in accordance with the disclosure of my Patent 2,676,929, as is the aforementioned carrier for the membrane or element 13q.

Figure 3:
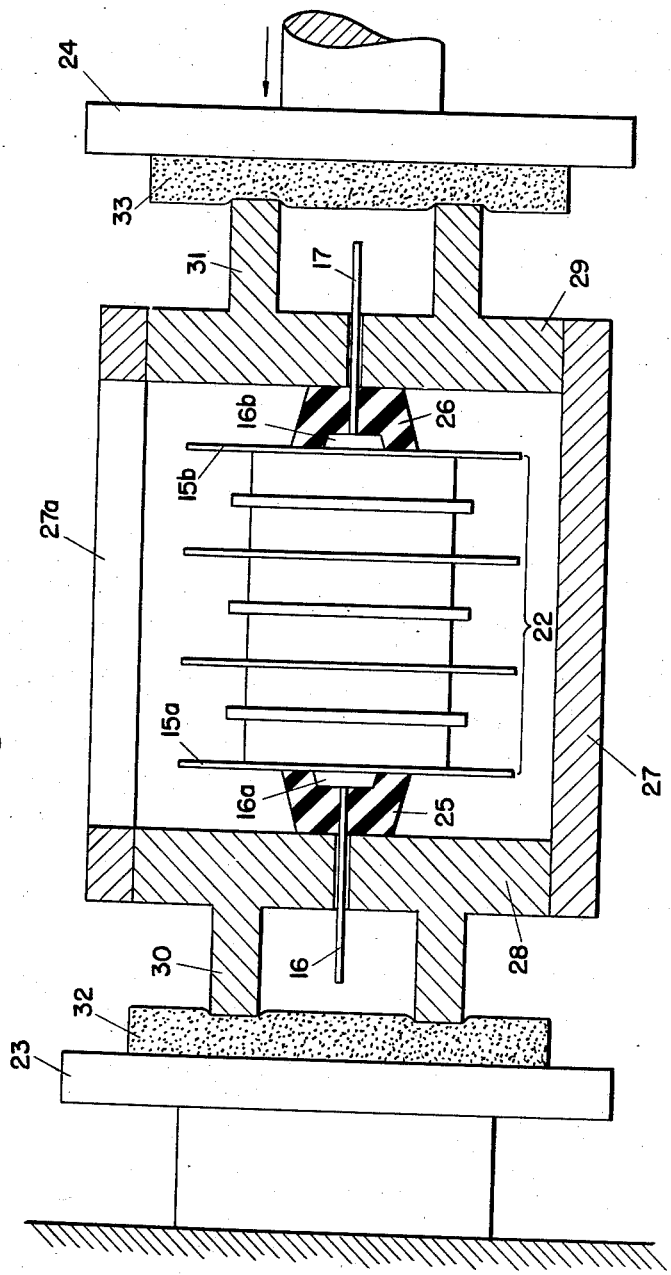
Fig. 3 is an elevation, partly in section, of the apparatus used for the encapsulation of the assembly.

The manner in which assemblies comprising electrodes, separator means, inter-cell connectors and end-plate connectors are encapsulated will now be described in connection with Fig. 3. One of the aforesaid assemblies 22 has been illustrated disposed between platens 23 and 24 of a suitable pressure-applying means which may be a vise or a press. The assembly 22 of battery elements has associated with the silver end-plates 15a and 15b preformed end members 25 and 26, preferably made of the same polymerized resin as the remainder of the finished container. It will be noted that the electrical contact elements 16a and 16b nest within recesses in the end elements 25 and 26. They are preferably included as inserts when elements 25 and 26 are molded to insure that the polymerizable resin in setting shrinks against the conductors 16 and 17 and against the contact elements 16a and 16b. The end elements 25 and 26 provide substantial surface area for development of the desired clamping pressure against the assembly 22 and as imposed by the platens 23 and 24. The mold for the encapsulating material is formed by a non-porous polyethylene tube 27 which along the upper surface is provided with an elongated slot 27a through which the encapsulating material may be introduced into and about the assembly 22. The tube 27 has closure members 28 and 29, also of non-porous polyethylene. Extending outwardly from closure members 28 and 29 are cylinders 30 and 31 of Plexiglas cemented to the polyethylene members 28 and 29. The hollow cylinders 30 and 31 provide adequate space for the lead wires 16 and 17. The outer ends of cylinders 30 and 31 bear against compressible pads 32 and 33 which may be of rubber or similar elastic material. They serve to maintain the assembly 22 under compression in the event that there is any contraction of the assembly 22 upon polymerization of the encapsulating resin.

The encapsulating resin, though it may be fairly viscouse, has sufficient flow properties that upon being poured into the rectangular slot indicated at 27a, it will thoroughly fill the mold to complete exclusion of all gas, and upon polymerization will harden or set with shrinkage against all external surfaces of the assembly 22. In this connection, it is to be noted that the end elements 25 and 26 are truncated with the larger diameters adjacent plates 15a and 15b. Accordingly, there will be interlocking between the encapsulating compound and the end plates 25 and 26 to provide enhanced strength and a highly effective hermetic seal.

In general, it will be preferable to treat all exposed surfaces, particularly the plates and separators prior to the encapsulating step to prevent ingress of the epoxy resin into their porous structures. If, prior to encapsulation, there is introduced into the porous structure of each cell the electrolyte in quantity adequate to saturate the elements, the introduction of the electrolyte itself affords the needed treatment to prevent ingress of the epoxy resin. Where the encapsulation is completed with dry elements, a preliminary treatment of the exposed surfaces will be desirable and can be accomplished in several ways. For example, adhesively coated cellophane, or other epoxy-impervious coatings, can be applied. A partially cured epoxy composition of high viscosity may be applied as a pre-coating. The encapsulating step may be accomplished in one operation as described above, or in two steps. In some instances, it will be preferred that the end walls 20 and 21, Fig. 1, be prefabricated and utilized in the compression step as end plates. In the two-step method a second mold can provide for a second encapsulation of the assembly following the first operation.

If the encapsulation is completed with a dry electrode-separator assembly, then after the hardening by polymerization of the encapsulating resin, small holes will be drilled from the exterior for communication with each electrode. The assembly will then be subjected to vacuum. After the pressure has been reduced within the assembly, it will be immersed into electrolyte. The electrolyte will thus be drawn into the assembly for saturation of the electrodes and separators. Thereafter, the openings will be closed, as by plugs cemented in place with the epoxy resin.

While encapsulating materials of various kinds can be used, I prefer to use a polymerizable resin known as a Bisonite polyamide-epoxy which consists of 5 parts by weight of K–1, a clear casting resin, and one part by weight of K–4, a catalyst, these being designations of the materials available from the Bisonite Co. The resin composition has the characteristic of slight shrinkage and thus assures that the compressive forces developed during the potting operation are not only retained, but likely increased during the cure or polymerization of the composition. Other epoxy resins suitable for encapsulating material include "Epon 828" available from the Shell Chemical Company, together with its curing agent; from the Bakelite Co., "Erl 2795," used with its "Erl Curing Agent 2793"; and from the Jones Davney Corp., its epoxy "504"—3 parts with 1 part #510 used with the Shell curing agent. For additional information on epoxy resins, reference may be had to Modern Plastics, September 1956, Encyclopedia Issue, particularly page 105 et seq., which describe a number of epoxy resins and their use.

Though I prefer to utilize polymerizable resins of the epoxy type since they are conveniently available in monomer form, i.e., available as a liquid which makes for ease in the encapsulating step, nevertheless it is to be understood the present invention includes the use of other resins inert to the materials, and reactions which take place, within the battery container. Other resins having the aforesaid characteristics and which also exhibit shrinkage or hardening from liquified form include polyethylene which may be molded around and about the assembly to encapsulate it and to provide the requisite wall thickness. Polystyrene or rigid polyvinyl chloride are equally suitable. Other resins may be selected on the basis of the foregoing characteristics and in terms of the temperatures at which they can be molded about the assembly without damaging the separating means 13a.

The wall thickness of the container formed by the encapsulating resin is made adequate to resist any tendency for the assembly dimensionally to change during charging and discharging of the electrodes. The exact thickness will vary depending on the size of the assembly, its length, and the like. For an assembly such as illustrated in Fig. 1 where the electrodes comprise discs approximately one inch in diameter, a wall thickness of about ⅜ inch will be adequate.

With the assembly completed as described above, the battery is now ready for its initial charging. In accordance with the present invention, it is preferred that the formation of the electrodes takes place after the encapsulation. Though formation may take place before encapsulation, unless unusual safeguards are followed against contamination and introduction of impurities, the results noted above are not likely to be achieved. Encapsulation would be more difficult with formed plates due to the possibility of gas evolution. However, by forming the plates after encapsulation, the foregoing difficulties are avoided and there are additional advantages. I conceive that the mechanism of negative formation takes place in the encapsulated battery as a two-step process. Since zinc oxide is soluble in the alkaline electrolyte (which for the silver-zinc system may be potassium hydroxide, 30% to 40%), after attainment of equilibrium there will be present in the electrolyte potassium zincate ($K_2Zn O_3$).

As the charging or forming current flows through the several cells, the current plates out from the electrolyte, specifically the potassium zincate, metallic zinc in the form of thread-like feeders which extend through the interstices of the negative electrode from the inter-cell barriers (which feeders effectively form grids for the negative electrodes) to the interface at the separator assembly. The second phenomenon following the plating out of the zincate to form the thread-like feeders is the conversion of the zinc oxide to zinc. While the feeders initially form at the inter-cell barriers and move outwardly therefrom, the conversion of the zinc oxide to zinc progressively takes place from the separation interfaces toward the inter-cell barriers. The foregoing phenomena appear to be contrary to that which takes place with conventional zinc electrodes and likely in part accounts for the high electrical efficiencies attained. It is important here to note that since the negative electrode was structurized as by sintering and by reason of the foregoing phenomenon, it does not, after charging, lose its structural strength to a point where it can be crushed. This feature contributes to the maintenance of the assembly as a whole under the compression imposed by the encapsulating steps above described. There is substantial dimensional stability of the negative electrode during charging and discharging.

Because after structurizing the sintered positive electrodes have higher initial strengths than the negative electrodes, the positive electrodes do not give rise to dimensional changes which diminish the compressive forces on the assembly.

The forming or charging current is continued until there is a voltage rise to a selected value. The terminal voltage is selected in conventional manner and in terms of the magnitude of the charging current. The charging rates are conventional; they need not be lower than for unsealed cells.

During charging, there will tend to be evolved at the positive electrode some oxygen. Such oxygen as may appear, however, appears to recombine with the silver or the silver oxide and thus minimizes any rise of gas pressure within the sealed battery. It is considered that the combination of the oxygen with the silver or silver oxide also explains in some degree the unexpectedly high efficiencies achieved.

What is claimed is:

1. A rechargeable storage battery of the alkaline type comprising positive and negative electrodes for a silver-zinc system, separator means disposed between the positive and negative electrodes and including an element consisting of a polyelectrolyte in continuous phase throughout a porous carrier and at least one additional element having one surface in contact with a surface of said polyelectrolyte carrier and made of a porous and resiliently compressible insulating material, the assembly including said electrodes and said separator means being porous and including in the pores thereof an alkaline electrolyte, and an encapsulating container for said assembly, said container consisting of a polymerized epoxy resin which exhibits substantial shrinkage upon hardening thereof, said resin having its internal surface in contact with all external surfaces of the assembly thereby to exclude all air and to seal the assembly in the absence of any gas space external to the assembly, the polymerization of said resin forming an encapsulating wall whose internal surface is compressively urged against all external surfaces of said assembly.

2. A rechargeable storage battery of the alkaline type comprising positive and negative electrodes, separator means disposed between the positive and negative electrodes and including an element consisting of a polyelectrolyte in continuous phase throughout a porous carrier and at least one additional element having one surface in contact with a surface of said polyelectrolyte carrier and made of a porous and resiliently compressible insulating material, the assembly including said electrodes and said separator means being porous and including in the pores thereof an alkaline electrolyte, and an encapsulating container for said assembly, said container consisting of a resin which exhibits substantial shrinkage upon hardening thereof, said resin having its internal surface in contact with all external surfaces of the assembly thereby to exclude all air and to seal the assembly in the absence of any gas space external to the assembly, the polymerization of said resin forming an encapsulating wall whose internal surface is compressively urged against all external surfaces of said assembly.

3. The rechargeable storage battery of claim 2 in which said positive and negative electrodes are preformed and which together with said separator means form a pile-type battery, and means including conductors and contact elements respectively engaging the end-most electrodes for flow of current to and from the battery.

4. A rechargeable storage battery of the alkaline type comprising positive and negative electrodes, separator means disposed between the positive and negative electrodes and including an element consisting of a polyelectrolyte in continuous phase throughout a porous carrier and at least one additional element having one surface in contact with a surface of said polyelectrolyte carrier and made of a porous, inert and resiliently compressible insulating material, the assembly including said electrodes and said separator means being porous and including in the pores thereof an alkaline electrolyte, and an encapsulating container for said assembly, said container consisting of a resin which exhibits substantial shrinkage upon hardening thereof, said resin having its internal surface in contact with all external surfaces of the assembly thereby to exclude all air and to seal the assembly in the absence of any gas space external to the assembly, the polymerization of said resin forming an encapsulating wall whose internal surface is compressively urged against all external surfaces of said assembly, said container having a wall thickness providing adequate strength to resist any tendency for the assembly dimensionally to change during charging and discharging of the electrodes.

5. A rechargeable storage battery of the alkaline type comprising positive and negative electrodes, each negative electrode comprising sintered zinc oxide and each said positive electrode comprising sintered silver, chemically inert separator means disposed between the positive and negative electrodes and including an element consisting of a polyelectrolyte in continuous phase throughout a porous carrier and at least one additional element having one surface in contact with a surface of said polyelectrolyte carrier and made of a porous and resiliently compressible insulating material, the assembly including said electrodes and said separator means being porous and including in the pores thereof an alkaline electrolyte, and an encapsulating container for said assembly, said container consisting of a resin which exhibits substantial shrinkage upon hardening thereof, said resin having its internal surface in contact with all external surfaces of the assembly thereby to exclude all air and to seal the assembly in the absence of any gas space external to the assembly, the polymerization of said resin forming an encapsulating wall whose internal surface is compressively urged against all external surfaces of said assembly.

6. An electric battery of the alkaline type comprising structurized porous positive and negative electrodes, electrolyte permeable separator means disposed between said positive and negative electrodes and extending outwardly from the entire periphery of the electrodes, an electrically conductive electrolyte-impermeable intercell barrier disposed in face to face relationship with each pair of electrodes of opposite polarity and extending outwardly from the entire periphery of the electrodes, the pores in said porous electrodes and separator means containing an alkaline electrolyte, and an encapsulating container surrounding the assembly including said electrodes, separator means, and intercell connectors, said container consisting of a polymerized resin which exhibits substantial shrinkage upon hardening thereof, the polymerization of said resin forming an encapsulating wall whose internal surface is compressively urged against and in contact with all external surfaces of said assembly to exclude all air and to seal the assembly in the absence of any gas space external to the assembly.

7. The battery as specified in claim 6 wherein the intercell barrier extends outwardly from the entire periphery of the electrode a greater distance than the separators.

8. The method of making a storage battery which comprises the steps of forming an assembly of positive and negative electrodes with an electrolyte-permeable, porous separator interposed between the electrodes of each cell, an electrically conductive electrolyte-impermeable inter-cell connector between each cell containing a pair of electrodes, electrically conductive plates in contact with the outer faces of the two electrodes forming the respective ends of the assembly, said separator and said inter-cell connectors extending outwardly throughout the periphery of each electrode, applying compressive forces lengthwise of the assembly to maintain the assembly under compression, surrounding the assembly with a sheath, filling said sheath with a polymerizable resin having the characteristic of exhibiting substantial shrinkage upon polymerization thereof, and maintaining said compression during polymerization of said resin for production of compressive forces against all external surfaces of said assembly after completion of said polymerization.

9. The method of claim 8 in which electrolyte is added to each cell after said encapsulation of said assembly.

10. The method of claim 8 in which electrolyte is added to each electrode through passages extending respectively into communication with each electrode in amount sufficient to saturate them and the adjacent porous separator material, and thereafter hermetically sealing said passages.

References Cited in the file of this patent

UNITED STATES PATENTS

| | | |
|---|---|---|
| 2,542,710 | Ruben | Feb. 20, 1951 |
| 2,575,337 | Ellis | Nov. 20, 1951 |
| 2,646,455 | Jeannin | July 21, 1953 |
| 2,684,989 | Wilburn | July 27, 1954 |
| 2,747,009 | Kirkwood | May 22, 1956 |
| 2,773,924 | Brill | Dec. 11, 1956 |
| 2,816,154 | Mendelsohn | Dec. 10, 1957 |
| 2,820,081 | Daley et al. | Jan. 14, 1958 |
| 2,831,045 | Harding | Apr. 15, 1958 |
| 2,833,848 | Marty | May 6, 1958 |
| 2,865,976 | Jammet | Dec. 23, 1958 |
| 2,889,389 | Tamminen | June 2, 1959 |